United States Patent [19]

Capen

[11] Patent Number: 5,049,199
[45] Date of Patent: Sep. 17, 1991

[54] POTABLE WATER RECOVERY AND FLUID PREHEATER FOR SYRUP EVAPORATOR

[75] Inventor: David A. Capen, East Arlington, Vt.

[73] Assignee: Vermont Maple Water, Inc., East Arlington, Vt.

[21] Appl. No.: 530,829

[22] Filed: May 30, 1990

[51] Int. Cl.$^5$ .............................................. C13D 1/12
[52] U.S. Cl. ...................................... 127/9; 159/26.2; 159/46; 202/185.1
[58] Field of Search ................. 127/9; 159/17.1, 26.2, 159/17.4, 46; 202/185.1, 185.6

[56] References Cited

U.S. PATENT DOCUMENTS

| | | | |
|---|---|---|---|
| 709,297 | 9/1902 | Bender | 159/26.2 |
| 884,272 | 4/1908 | Grimm | 127/9 |
| 1,023,896 | 4/1912 | Voss | 127/9 |
| 3,832,289 | 8/1974 | Kays et al. | 159/17.1 |
| 4,819,615 | 4/1989 | Richardson et al. | 127/9 |

OTHER PUBLICATIONS

Catalog-G. H. Grimm Co., 1990 Sugaring Season, pp. 1-4.

*Primary Examiner*—Theodore Morris
*Assistant Examiner*—P. L. Hailey
*Attorney, Agent, or Firm*—Schmeiser, Morelle & Watts

[57] ABSTRACT

A preheater-potable water condenser for sap concentrating boiler-evaporators. A housing which contains a dual manifolded multitubular heat exchanger is fixed to, but removable from, the vertical vent stack of a hooded syrup concentrator-boiler. The preheater-condenser is an improvement over the state of the art because its vertical positioning, in conjunction with an inclined, ganged and multitubular heat exchanging array, presents a greater heat exchanger surface area to be exposed directly to the boiler exhaust, thus enhancing heat exchange efficiency. In addition to preheating the liquid which is to be concentrated to syrup, positioning above the hood (and away from the boiling and spattering base fluid) facilitates the use of the tubular array as a condenser by which to accumulate distilled water. An oblique (inclined) disposition of the tubular array aids the condensation and accumulation process, the latter being acquired in specially compartmented areas of the housing. During the operation, base fluid is preheated for subsequent introduction to the boiler, while potable water is drawn off from the accumulation areas.

11 Claims, 2 Drawing Sheets

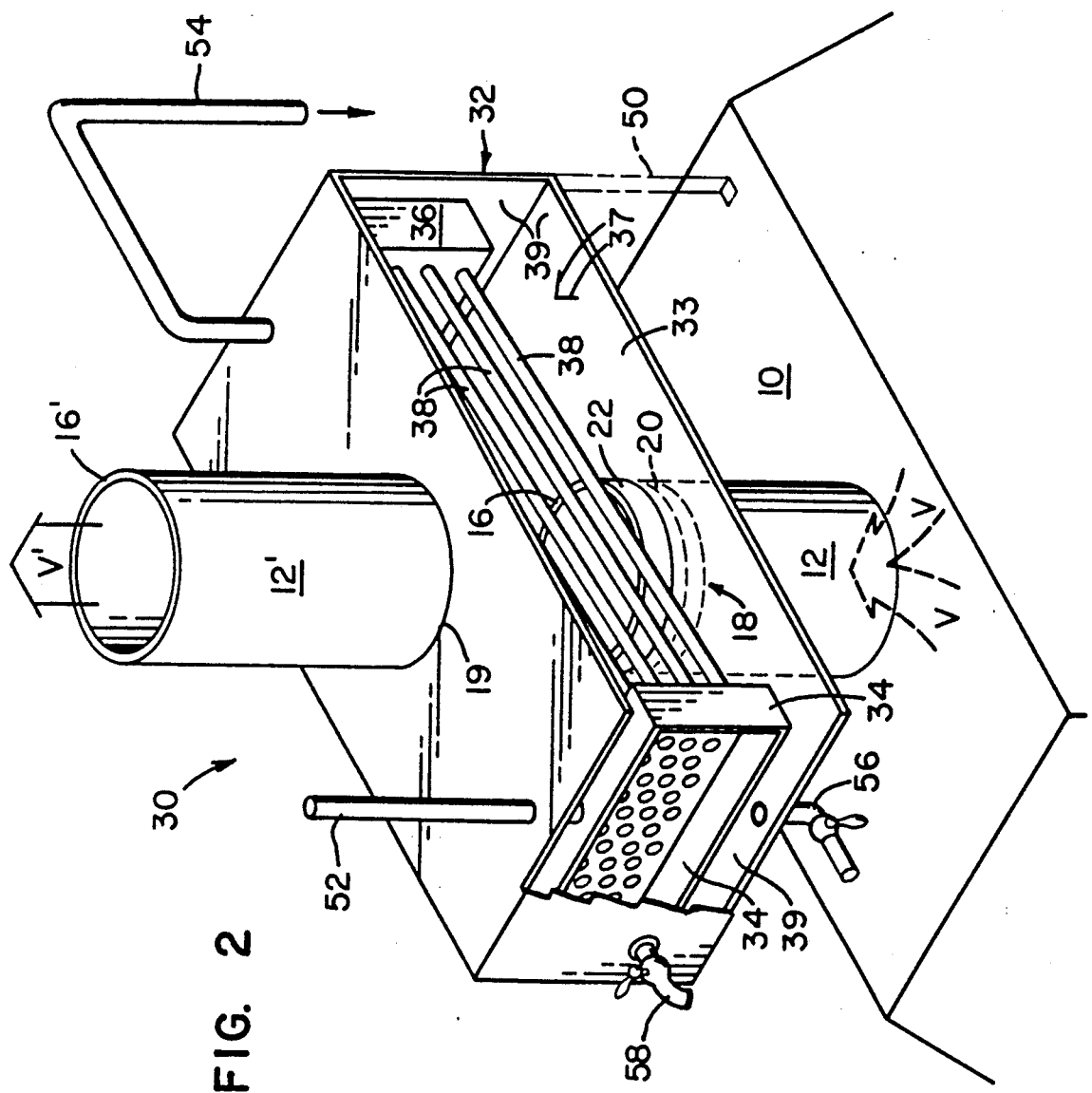

POTABLE WATER RECOVERY AND FLUID PREHEATER FOR SYRUP EVAPORATOR

BACKGROUND OF THE INVENTION

1. Field of the Invention

This invention relates, in general, to a syrup evaporator apparatus having included therein a preheater for base fluid (sap) that is to be concentrated, and more particularly, a preheater that operates as a condenser to recover potable water from the evaporator exhaust effluent.

2. Discussion of the Art

The concentration of sugar-containing fluid in order to acquire a syrup is a well practiced art. Generally, evaporators of every type are used to manufacture maple sugar, sorghum and similar types of syrup or sugar products. In some of the modern day concentrator-evaporator apparata, preheating devices are used in order to pretreat the base fluid (sap) in anticipation of its introduction to the boiler (or evaporator) stages in the equipment. In the syrup producing industry, few seem to have concentrated on improving the preheating device, and perhaps less have attempted to recover any useful product from the vented effluent which is comprised almost entirely of steam. Quite matter-of-factly, any effluent more than a couple of feet above the boiling pan liquid surface comprises only steam.

Having a knowledge of these facts and an intention to improve the heat exchange characteristics of base fluid preheaters, as well as ameliorate what I perceive as waste of the unused steam effluent, I devised the instant invention to greatly enhance base fluid preheating while concurrently recovering, for the first time, potable water from the vented steam of almost any syrup evaporator.

After an exhaustive search in the literature available in the sugar and syrup making industry, as well as the patents available in the United States Patent and Trademark Office, I found only two references having any relevance to the instant invention. U.S. Pat. No. 4,819,615, issued to Richardson et al. in April 1989, discloses what the patentees term a piggy-back evaporator system. This comprises a sealably coupled box overlying a similar box-shaped sugar maple sap evaporator. An oblique condensate drain sheet extending the major length of the piggy-back evaporator funnels condensate from the bottom surface of the piggy-back apparatus back into the evaporator pan. Sap in the piggy-back pan is, more or less, preheated and introduced to the evaporator boiling pan. The steam vent, perched atop the hood of the evaporator is ordinary and otherwise unremarkable. Richardson et al. do not teach a preheater as a separable unit that is attachable to the stack or any stack which serves as a steam vent in the entire apparatus class known as concentrators/evaporartors.

The more relevant art discovered is found in the 1990 Sugaring Season Catalog of the G. H. Grimm Company of Rutland, Vt. The Grimm Company has, for years, been the leader in the maple syrup production industry and has recently begun to display a side-mounted preheater apparatus for use with its Lightning Evaporator TM syrup concentrator. The Grimm preheater uses recycled flue pan steam to heat cold sap by passing the sap through a two inch copper coil pipe before it is introduced to the regulator which controls the volume of sap introduced directly into the boiling pan. The Grimm Company employs a side-mounted unit to preclude condensed steam from dripping back into the flue pan, contra the Richardson et al. teaching. The Grimmy teaches that such a dripping back inevitably slows down the boiling process. Instead, in the Grimm preheater, a steady stream of hot water escapes out of the farside of the device; the water being clearly of a non-potable nature in that it is used according to the teachings of the Grimm Company for "clean-up chores". For all of its improvement to the art, however, the Grimm apparatus contains two obvious drawbacks in this preheater-condenser apparatus: first, the side mounting of the preheater places it immediately adjacent the boiling pan and thus makes it susceptible to spattering and foam overflow contamination of the condensed water that is used for cleaning chores; and second, the diameter of the copper coil pipes in the exchanger limit the surface area for heat transfer as well as the amount of contact area that would generate a greater amount of steam condensate for such chore work. Thus, the Grimm preheater-condenser produces a relatively low volume of contaminated condensate (contaminated with sap or other base fluid impurities) while it lacks optimum heat exchange efficiency because of the limited surface area available in such a heat exchange apparatus.

My invention, an improved preheater-condenser fulfills the need for a full-spectrum evaporator apparatus not quite achieved by Richardson et al., while greatly improving, especially by facilitating the production of potable water, the G. H. Grimm preheater-condenser.

SUMMARY OF THE INVENTION

The invention, combines in one piece of apparatus a heat exchanger and distilled water still that can be adapted quite readily for connection to most evaporator apparatus having some form of hood and vent stack. It is, in essence, a singular unit that is fitable atop the vertical vent stack of any conventional syrup concentrator (evaporator) that has a boiling pan, a hood which converges or upwardly funnels steam to the vent stack and which presents sufficient attachment points (hardpoints) for the connection of my invention to the concentrator/evaporator apparatus.

The invention comprises an ordinary plenum or housing, a rectangular box or cube being the preferred shape, which is used to confine the preheater-condenser tubular array so as to posture the array between the plenum base vapor inlet port and top vapor vent. Thus, the housing is essentially an extension of the evaporator vertical vent stack. The tubular array that serves as the preheater-condensor nexus is inclined to the horizontal, a functional arrangement which assures that condensate collecting on the outside of the various tubes will run downward, under the influence of gravity, toward the tube origins, an input manifold. The tubular array is therefore a set of tubes that is ganged at each end to a smaller plenum-like chamber, the tube origins diverging from what is termed the inlet manifold (the inlet chamber) and their terminals converging in the outlet manifold (a similar outlet chamber). The main plenum, or housing through which the vapor venting takes place contains at least one baffle or partition, more an elevated margin, that is used to delineate the plenum from a condensate accumulation area. Once the potable water is effectively condensed, and the condensate runs down the inclined tube network to the face of the inlet manifold, it descends to the base of the evaporator-condenser unit, which is, when properly partitioned from the vent inlet, an accumulation pan—the condensate accumulation area (CAA).

Ancillary apparatus is used in conjunction with the invention according to the desires and the needs of the individual user. Generally, a fresh (sap) source conduit, an inlet, is provided to the intake manifold connection port, while an outlet manifold port is provided with other conduiting means that will vent the preheated sap from the output manifold into the boiler pan or any other necessary regulating apparatus. Finally, venting means are provided at the base of the evaporator-condenser into the CAA so that the potable, literally distilled, water may be drawn off for myriad uses beyond the mere cleaning of tools and equipment.

BRIEF DESCRIPTION OF THE DRAWINGS

Of the drawings:

FIG. 2 is a partially isometric illustration of the invention installed above an evaporator hood.

DETAILED DESCRIPTION OF THE PREFERRED EMBODIMENT

Conventionally, when a sugar maker uses a preheater, in conjection with a steam hood, the hood unit is placed tightly over the flue or boiler pan. When using a hood, however, a normal skimming process is postponed until the end of the work day when the evaporator is cool. By not conducting a regular skimming during evaporation, a foam commonly builds up to a depth of two or three inches and its components, usually niter, silica and lime sand, are spattered inside the flue pan and steam hood area by the violent and rapid geyser-like boiling of the sap. Consequently, any distillate which condenses against preheater coils or tubes, which are generally within range of such spattering from the boiling sap, is recontaminated. Further, the best conventional preheaters utilize copper coil because of the high rate of heat exchange (copper conductivity) than would be available with other materials. I, however, use approximately 30 stainless steel tubes that are manifolded together by stainless steel chambers (plenums) which allow condensate to form thereon and accumulate subsequently in a pan also made of food-grade stainless steel. Thus, the condensate that is recovered in this operation, at a recovery rate of about 100 or more gallons per hour, is chemically pure and potable because it avoids the aforementioned sap contamination and that of copper, the use of which is not permissible in the process of distilling water for human consumption.

Figure 1:
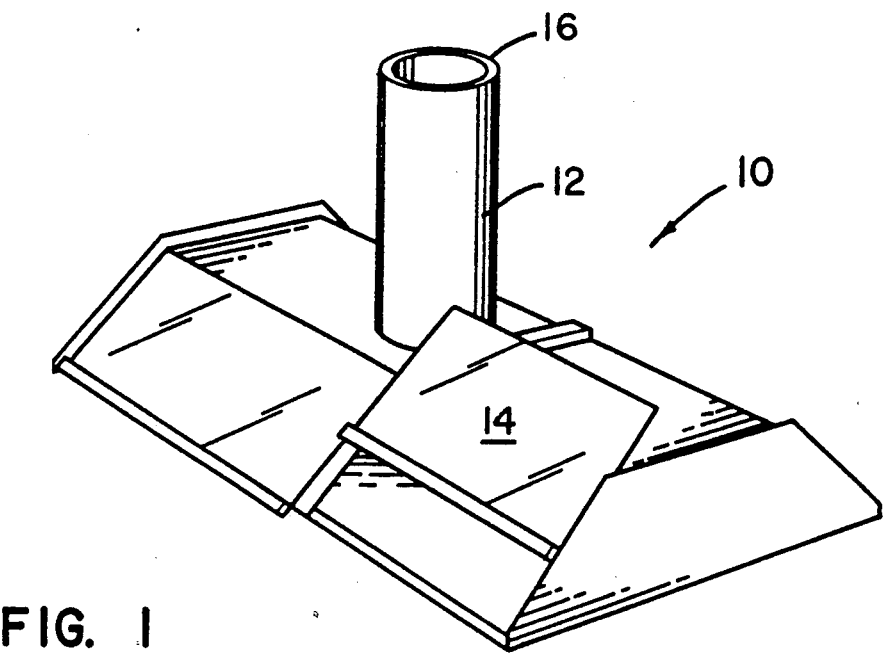
FIG. 1 is an isometric illustration of a prior art, vertically vented evaporator hood.

Referring particularly to FIG. 1, there is illustrated therein a typical evaporator hood 10 and vertical vent stack 12. The access door 14 is common to this type of apparatus but, insofar as the remainder of this disclosure is concerned, will no longer be discussed. The reader should take note that the upper rim 16 of the vent stack 12 is of rather sturdy construction. The stack should be of a geometry that will allow its acceptance by the base vapor inlet apparatus of the invention without use of complex adaptation equipment. The only ancillary equipment to be used with the stack 12 is the circumferential flange 20 (not shown) that is fixed to the stack rim so that the invention may be adaptively fitted over its top rim 16. This discrete apparatus will be discussed hereinafter.

The partial cut-away isometric illustration of FIG. 2 serves to comprehensively display the salient elements of the invention 30 while affording the reader an overview of its operation. Beginning with the prior art apparatus discussed in FIG. 1, a vapor funneling or converging hood 10 of a common syrup evaporator variety is configured to vent the water vapor-steam V through vertical vent stack 12, normally into the atmosphere. In order to join the invention 30 to the conventional vent stack apparatus, a circumferential stack flange 20 is provided. Those of ordinary skill will recognize that similar forms of bracing equipment may be used in lieu thereof. The invention proper is perched atop vent stack 12 and support structures 50 are typically employed (one shown) to rigidize the invention 30 in its position on the vent stack 12 by securing it to the conventional hood 10. The extension of the vent stack, seen as the margin 16 extends into the plenum 37 of the invention housing 32 and is therein further surrounded by baffle 22. The vertical vent stack entrance, and its associated apparatus are characteristic of the base vapor inlet 18 of the invention 30. Correspondingly, the top vapor vent or outlet 19 is afforded a stack extension 12' and stack margin 16' through which moisture-depleted vapor V' is exhausted to the atmosphere. Final to the housing 32 are the interior wall, base and top surfaces 39. Thus, it may be readily seen that the lower portions of the side wall surfaces 39, the upper surface of the bottom of the housing 33 and the partition or baffle 22 which surrounds the margin portion 16 of vertical vent stack 12 comprise a defined area within the housing 32 known as the condensate accumulation area (CCA). It may now be seen that, in operation, the water laden steam vapor V rises through the vertical vent stack 12 into the invention 30 plenum chamber 37, there encountering the primary operative apparatus of the invention.

Having risen a predetermined distance (depending upon the rapidity of boiling and the violence of the evaporation operation), the rising vapor V is free of any contamination and spattering of sap impurities. Once in the plenum 37, the vapor contacts the heat exchanger-condenser apparatus which is herein illustrated and comprises: an intake manifold 34 which is a chamber located fairly close to the base 33 of the housing 32 and is sealed to the sidewall thereof; a plurality of parallel tubes 38 arrayed in a ganged formation diverging from the manifold chamber 34 and rising obliquely across the major base area of the plenum 37; and a chamber which forms outlet manifold 36. The ganged tubular array 38 is a closely registered network of heat exchange elements that provide an extremely large surface area for the collection thereon of condensate, which condensate consists of pure, distilled water. Because of the array 38 inclination to the horizontal, the condensate collected thereon readily runs down the individual elements 38 of the array, either encountering the input manifold 34 and running thence into the condensate accumulation area CAA or, simply dripping off the individual elements 38 into the CAA. Ancillary apparatus, not necessarily functional in the heat transfer-condensation scheme are employed in actual operation. These consist of an input conduit 52 used to afford a source of the liquid which is to be concentrated, an output conduit 54 which vents preheated base fluid (the liquid (sap) to be concentrated) into the evaporator or evaporator regulating apparatus (not shown), and a distillate or condensate drain 56 which is used to draw off the condensate liquid which has accumulated in the CAA. Drains 58 and 59

(not shown) are not properly part of the aforementioned ancillary equipment since they are provided only to drain the manifold chambers 34 and 36 after operations have been shut down. In my preferred embodiment, I employ approximately 30 stainless steel tubes manifolded together by the aforementioned manifold chambers or compartments (34, 36), which are also made of stainless steel. The ganged tube array is oriented on a 60 degree incline which is realized from end to end of the housing-collection chamber CAA, also made of stainless steel. As mentioned earlier, stainless steel is used because, in the production of distilled water, none of the conventional heat exchange-condensate contacting material, such as copper, may be used. This complys with both federal and state health standards, as well as meeting the high standards within the edible syrup producing industry.

Figure 3:
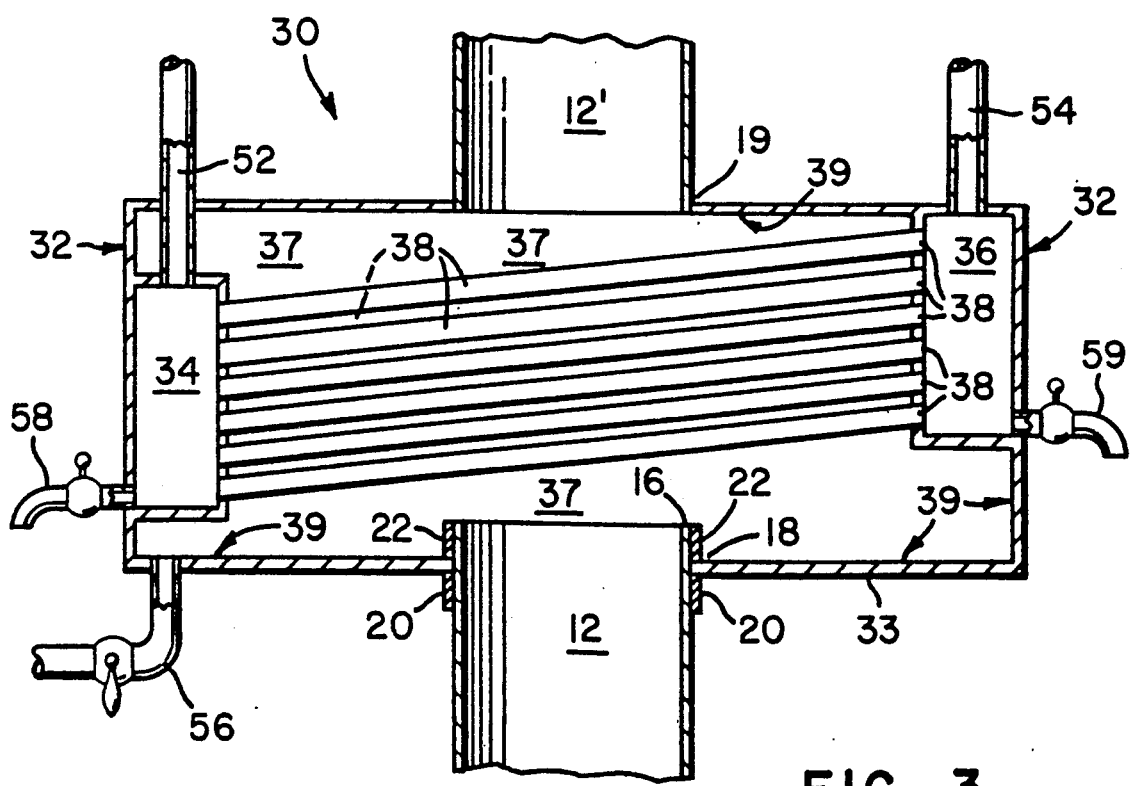
FIG. 3 is a sectionalized side elevation of the invention installed on a vertical vent stack.

Final to the drawings, the sectionalized side elevation in FIG. 3 presents a clear view of the invention's 30 major elements comprising the housing 32 defining the plenum 37 and the condensate accumulation area CAA. The base fluid conduit 52 descends into input manifold 34 from which the ganged tube array 38 rises obliquely to output manifold 36; and ascending therefrom is output conduit 54 which is used to transport the preheated fluid into the evaporator pan (notshown). The reader will note that the apparent surface area of the tubular array 38 in the aggregate, and notwithstanding the spaced-apart registry of the individual tubes, far exceeds that of the prior art. In fact, the prior art unit (as discussed, the Grimm Company preheater-condenser) has a condensation contact area of approximately 1,735 square inches, while my preheater-condenser has a condensation area of approximately 4,525 square inches or approximately 2 and ½ times the area of the Grimm device. It may be readily seen that my preheater-condenser provides a novel improvement in the field, particularly for the production of maple syrup and sugar. It is clearly an advance over the state of the art preheater-condenser in that first, it operates in a zone which is well clear of boiling sap contamination; second, it operates in an area in which the vented steam has already begun to cool and, therefore, the condensation process is be conducted more efficiently; third, the much larger area for heat transfer-condensation greatly enhances the performance of these functions; and fourth, a better environmental balance is struck and I have recover a most useful by-product from the sap making process—distilled water. By creating an easily removable device, I have afforded the industry an opportunity to retrofit my invention to all existing hood-equipped evaporators, as well as having eliminated the cumbersome, side-mounted preheater-condenser of the existing art. Those of ordinary skill will readily see the advantages to using my invention and will no doubt conceive additional uses for it. Such may be readily pursued without departing from the scope of the invention which is hereinafter secured by the appended claims.

What is claimed is:

1. In a syrup evaporator with potable water means having a boiling pan for evaporating water from sap, a hood with a vertical vent stack mounted atop the hood and a base fluid preheater, an improvement comprising:
a plenum for confining therein a tubular array, said plenum defining a base interior and exterior flanged vapor inlet and a top vapor vent and further defining baffle means for differentiating a liquid collection space from a vapor transition space therewithin, said plenum mounted by flange engagement atop said vertical vent stack and receptive at one side thereof an upper first exterior fluid conduit and at another side thereof, a second exterior fluid conduit; and
a ganged, inclined multitubular array for conducting a fluid therethrough, said array inclined to urge condensate run off towards a lower end thereof within said plenum, the condensate isolated by said baffle means, and having an input manifold and output manifold communicating with each end of said array, said input manifold disposed lower than said output manifold, said array disposed within said housing, said input and output manifolds communicating with said upper first exterior and second exterior fluid conduits, respectively, whereby a liquid sap which is to be concentrated enters said evaporator through and at said first upper exterior conduit, flows downward into said input manifold and thence into said multi-tubular array, rises by virtue of the inclined array and entering sap flow while it is subjected to heating by steam vapors rising through said vertical vent stack into said plenum, and thereafter heated fluid passes out of said array through said output manifold and into said second exterior conduit and thence to the boiling pan, while condensate runs down said inclined tubular array and collects in said plenum as potable water isolated from the vent stack by said baffle means.

2. The invention of claim 1 wherein baffle means is a barrier in said plenum which defines a condensate isolation area within said liquid collection spaces and isolates condensate from vapors within said vent stack, said condensate forming on fluid-filled tubes of said inclined array and running thence downward, owing to the inclination of said array, and into said condensate isolation area.

3. The invention of claim 2 further comprising at least one liquid vent means penetrating said condensate isolation area for drawing off said condensate.

4. A syrup evaporator preheater-condenser unit for preheating liquid sap while condensing water from vented vapors rising from a syrup making boiler through at least one boiler vent stack, said unit comprising:
a housing adapted to be flange mounted above said hood vent stack and receive therefrom said vented vapors;
combination conduiting means contained within said housing, said conduiting means defining sequentially connected apparatus including upper exterior input means, lower input manifold means, a ganged, inclined tubular plurality means and upper output manifold means, said conduiting means exposed directly to said vented vapors; and
separation means within said housing, said separation means for partitioning the housing into a vent stack plenum and a means for condensate isolation and potable liquid collection, said means for condensate isolation comprising baffle means surrounding the vent stack and said potable liquid collection means comprising plenum walls, floor and condensate isolation means.

5. The invention of claim 4 wherein said ganged, inclined tubular plurality means is an array of tubes arranged in spaced-apart, essentially longitudinally parallel registry, said array inclined above the horizontal plane in which said boiler resides.

6. An improvement to a fluid preheater-water condenser for use with an evaporative liquid concentrator having a hood with vertical vent means rising thereoutof, the improvement comprising:

a confinement means for receiving from a vertically rising exhaust vent of said concentrator a stream of moisture laden fluid and temporarily confining said fluid therein, said confinement means defining a vented enclosure that is securable by baffle/flange-resting means above said hood and which communicates with said exhaust vent means, said confinement means further defining a potable water accumulation area;

a heat exchange conduit means disposed in said confinement means and communicating through boundaries thereof, said heat exchange means exposed directly to said stream, said heat exchange means defined by an inclined multitubular array of heat exchange elements; said elements input manifolded at a first end of said confinement means and output manifolded at an end opposite and inclined above said first end; and means for communicating with said heat exchange means for introducing a base fluid to be concentrated into and above said input manifold to urge said base fluid through said array to said output manifold, whereby said base fluid passes through said input manifold, through said array and thereoutof into said output manifold having been heated by said stream and whereby said stream gives off latent heat, is cooled by the base fluid and potable water condensate devolves therefrom to accumulate on exterior surfaces of said array, to further be shed therefrom and into said potable water accumulation area.

7. The invention of claim 6 wherein said confinement means is a housing that has said input manifold sealed to it at said first end and said output manifold sealed to it at said opposite end and further, said means for communicating and for introducing the base fluid is an input conduit disposed above said output manifold.

8. The invention of claim 7 wherein said potable water accumlation area comprises lower confines of said confinement means including a baffle means which defines and delineates vent input means from said potable water accumulation area.

9. The invention of claim 6 wherein said means for introducing a base fluid comprises a conduit for introducing said base fluid from above and through said input manifold, through said array and out said output manifold.

10. The invention of claim 6 wherein said multitubular array of heat exchange elements is inclined approximately 60° above the horizontal.

11. In the preheater-water condenser of claim 9 a baffle/flange resting means comprising a baffle means within said confinement adapted to circumscribe the exhaust vent to serve as the baffle means and marginal support for cooperative engagement with a vent stack collar-like flange.

* * * * *